United States Patent [19]

Stengel

[11] Patent Number: 5,084,327

[45] Date of Patent: Jan. 28, 1992

[54] FLUORESCENT MARKING LIQUID

[75] Inventor: Rudolf Stengel, Nürnberg, Fed. Rep. of Germany

[73] Assignee: Faber-Castell, Stein, Fed. Rep. of Germany

[21] Appl. No.: 452,211

[22] Filed: Dec. 18, 1989

[30] Foreign Application Priority Data

Dec. 16, 1988 [DE] Fed. Rep. of Germany ....... 3842382

[51] Int. Cl.$^5$ .................. C09K 11/02; C09K 11/06
[52] U.S. Cl. ................ 428/206; 252/301.32; 252/301.35; 427/157; 428/690
[58] Field of Search ............ 252/301.32, 301.35; 428/206, 690; 427/157

[56] References Cited

U.S. PATENT DOCUMENTS

| | | | |
|---|---|---|---|
| 2,844,594 | 7/1958 | Long | 252/301.32 |
| 4,238,384 | 12/1980 | Blumberg et al. | 252/301.32 |
| 4,256,900 | 3/1981 | Rave | 252/301.35 |
| 4,670,183 | 6/1987 | Louman et al. | 252/301.35 |

*Primary Examiner*—James J. Seidleck
*Attorney, Agent, or Firm*—Michael J. Striker

[57] ABSTRACT

A new fluorescent aqueous marking liquid is described, which contains 0.20 to 2.0 % by weight of cumarin C.J. Basic Yellow 40 dye. The liquid is buffered to a pH value of from 3 to 5; it contains an acrylic resin dispersion at a pH of 3 to 5 with a particle agglomerate of 35 to 150 nm. The liquid does not act on a third dye, especially triphenylmethane dye, which is used frequently in carbon paper and is used also on smooth surfaces such as glass plastic foil or glazing paper.

14 Claims, No Drawings

FLUORESCENT MARKING LIQUID

BACKGROUND OF THE INVENTION

The present invention relates to a fluorescent aqueous marking liquid with a content of cumarin C.J.Basic Yellow 40 dye and, as necessary, an additional dye, and with a content of synthetic resin and, as necessary, a polyfunctional alcohol, such as glycol or its oligimers.

Aqueous writing and marking fluids to which a synthetic resin, e.g. polyacrylate, is added for assisting the fluorescent action, are described in German Open Patent Application 25 07 064. Different products have been mentioned as dyes, among others cumarin C.J.Basic Yellow 40 dye, which is marketed by the Firm, Ciba-Geigy under the name Maxilonbrillantflavin 10 GFF. Essential to the products described in this disclosure, the dyes react as a whole as a base, which is required to keep the above-mentioned polyacrylic resin in solution.

A marking liquid is described in the German disclosure 23 15 680 which contains hydroxypyrenetrisulfonic acid as a fluorescent dye. That the marking liquid with the fluorescent dye should be adjusted to a pH value which is in the alkaline region and advantageously to a value above 8.5 is basic to the above-named disclosure. The fluorescent effect of the above-named fluorescent dye develops completely in this pH region.

Although advantageously the alkaline pH-value may be adjusted in relation to the fluorescent effect and the intensity of the color regions, the alkalinity of the marking liquid can have a disadvantageous effect on the marking liquid. Particularly when the marking liquid is used on carbon paper, which contains triphenylmethane dye—especially in microencapsulated form—, the alkaline reaction of the liquid can lead to conversion of these compounds into the noncolored Leukoform and the writing can be extinguished because of that.

SUMMARY OF THE INVENTION

It is an object of the present invention to provide a fluorescent aqueous marking liquid, which on the one hand provides a sufficiently intense fluorescent region with good light stability and on the other hand can be used in carbon paper but does not influence another dye substance which is present, especially triphenylmethane dye.

The objects of our invention are obtainable because the cumarin C.J.Basic Yellow 40 dye can be used not only in the alkaline region but also in the acid pH region and in the acid pH region this dye may be used without influencing a third dye, particularly triphenylmethane dye which is present. Up to now difficulties have stood in the way of accomplishing this. On the one hand it was observed that also in the acid pH-region addition of an assisting resin, which acts to intensify the color and which prevents the penetration of dye color through the supporting paper can not be omitted. Resin, for example polyacrylic resin, which shows these effects and which are truly soluble in the acid pH-region, are not available. By experiment the inventor has established that certain acid acrylate dispersions can occur instead of true solutions, which have the property, in the pH region of 3 to 5, also in other acid regions, of existing in a finely dispersed form, in which the acrylic resin dispersion has a particle agglomerate having a size of from 35 to 150 nm. The size of this agglomerate allows marking liquids in which such acrylic resin dispersions are contained to be used in the standard felt tip marking unit, without clogging the felt tip or collection of the liquid in a pad of the unit.

Suitable acrylic resin copolymerizates include methyl methacrylates, butylacrylates and methacrylic acids. The copolymerizate can be describe be the following idealized structural formulas:

Formula I:

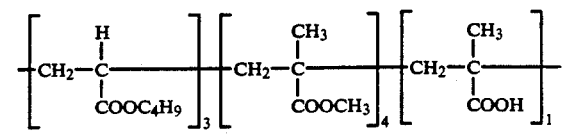

Formula II:

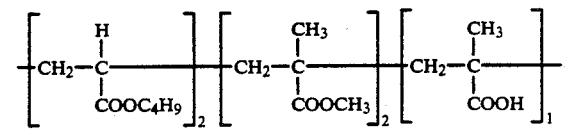

In the attempt to make an acid adjusted fluorescent marking liquid using cumarin dye and the above-named assisting acrylate dispersion it has proven advantageous to adjust the marking liquid to a pH value of 3 to 5 and to buffer it particularly at this pH value. It has proven advantageous to use a known citrate buffer or also a citrate phosphate buffer or other known buffer solution as a basic solution for making the marking liquid. A marking liquid according to the invention which reacts with acid and does not effect the third dye present for example can have the following composition:

| Aqueous buffer solution | |
|---|---|
| (pH between 3 and 5) | 40–50% |
| Dye, Maxilonbrillantflavin 10 GFF | 0.2–2.0% |
| Aqueous acrylate dispersion (pH ca. 3) | 40–50% | with the requirement that the sum of the components add up to 100%.

Other embodiments of the marking liquid contain polyvinyl pyrrolidone(Typ K5) as an agent for slightly increasing the viscosity and if necessary a suitable Tenside to increase the wetting of the fluid on the paper. Particularly sodium alkylbenzene sulfonates can be used as Tensides. Also additives such as glycol, diglycol or triglycol singly or severally or also in mixtures with Hexantriol in an amount of up to 10 % by weight can be used to influence the drying conditions of the marking liquid.

As a basic buffer solution one can use a solution with the following composition:
4.48 g NaOH
11.76 g citronic acid monohydrate
4.31 ml HCl 32%.

A buffer solution of this type has a pH value of 3.7. This has been tested in practical useage of the invention.

Marking liquids of the above-described type result in bright yellow colored regions without additional additives. The fluorescent region fluoresces in day light in moisture and also in a dry state. The dye components of the marking fluid do not effect a third dye, which is present on various standard papers, also on carbon paper. It has proven advantageous that the liquid can be used for writing or marking on smooth surfaces such as glass, plastic foil or glazing paper. Many commercial marking fluids are not used on these surfaces, since they result in no cohesive coating. These marked surfaces on glass, plastic foil or glazing paper are novel, useful and are to be considered part of the present invention.

The colors of the marking liquid can be varied in a known way by that additional dyes, which overlap the yellow cumarin dye forming other colored regions, for example an orange colored or a green region.

While the invention has been illustrated and described as embodied in a fluorescent marking liquid, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of the prior art, fairly constitute essential characteristics of the generic or specific aspects of this invention.

What is claimed as new and desired to be protected by Letters Patent is set forth in the appended claims.

I claim:

1. A fluorescent aqueous marking liquid containing
   a cumarin C.J. Basic Yellow 40 dye,
   an acrylic resin, and
   an aqueous buffer;
   said marking liquid being adjusted to a pH value of from 3 to 5, and said acrylic resin being present in a plurality of dispersed particle agglomerates so as to form a stable dispersion at said pH.

2. A marking liquid according to claim 1, wherein said dispersed particle agglomerates are made from a substance selected from the group consisting of acrylic acid, methyl methacrylates, butylacrylates, methacrylic acids and mixtures thereof, and each of said particle agglomerates has a size of from 35 to 150 nm.

3. A marking liquid according to claim 1, wherein the aqueous buffer is present in an amount of from 40 to 50% by weight, the cumarin C.J. Basic Yellow 40 dye is present in an amount of from 0.2 to 2.0% by weight, and water and the acrylic resin are each present in amounts such that the sum of the amounts of the aqueous buffer solution, the dye, the acrylic resin and the water add up to 100%.

4. A marking liquid according to claim 1, further comprising up to 5% polyvinyl pyrrolidone Type K15.

5. A marking liquid according to claim 1, further comprising up to 2% sodium alkylbenzene sulfonic acid.

6. A marking liquid according to claim 1, further comprising a polyfunctional alcohol.

7. A marking liquid according to claim 7, wherein said polyfunctional alcohol is present in an amount of up to 10 % by weight.

8. A marking liquid according to claim 7, wherein said polyfunctional alcohol is selected from the group consisting of glycol, diglycol, triglycol and hexantriol.

9. A marking liquid according to claim 1, further comprising an additional dye.

10. A marking liquid according to claim 9, wherein the additional dye is triphenylmethane dye.

11. A smooth surface selected from the group consisting of a glass surface, a plastic foil surface and a glazing paper surface which is marked with said fluorescent marking liquid according to claim 1.

12. A fluorescent aqueous marking liquid for cohesive marking of a glass surface, a plastic foil surface, a paper surface or a glazing paper surface, said marking liquid containing:
    a cumarin C.J. Basic Yellow 40 dye,
    triphenylmethane dye,
    an acrylic resin, and
    an aqueous buffer;
    said marking liquid being adjusted to a pH value of from 3 to 5, and said acrylic resin being present in a plurality of dispersed particle agglomerates so as to form a stable dispersion at said pH.

13. A method of making a cohesive coating on a glass surface, a plastic foil surface or a glazing paper surface comprising the step of applying a fluorescent aqueous marking liquid according to claim 12 to one of said surfaces.

14. A cohesive coated surface made according to the method of claim 13.

* * * * *